G. F. HESS.
COMBINED EGG BEATER AND CREAM WHIP.
APPLICATION FILED NOV. 21, 1910.
1,004,786.
Patented Oct. 3, 1911.
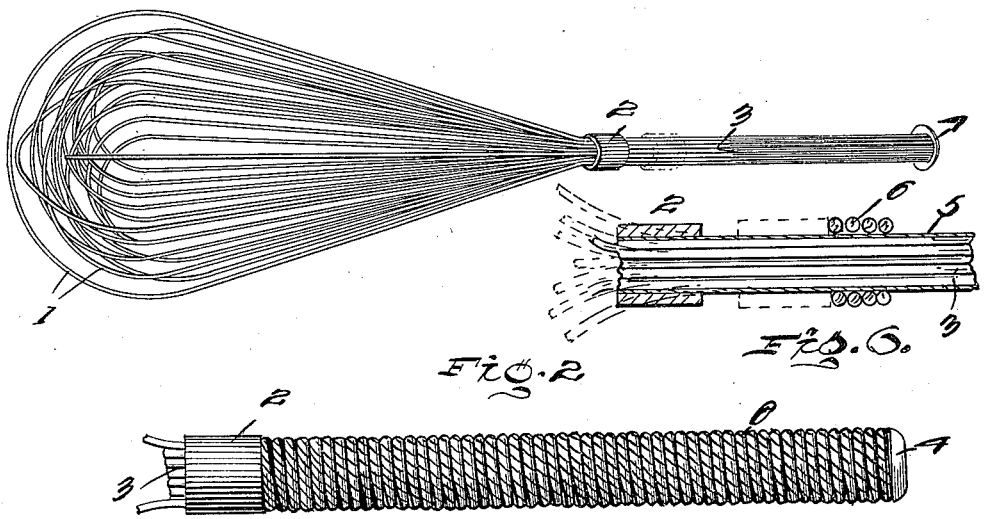
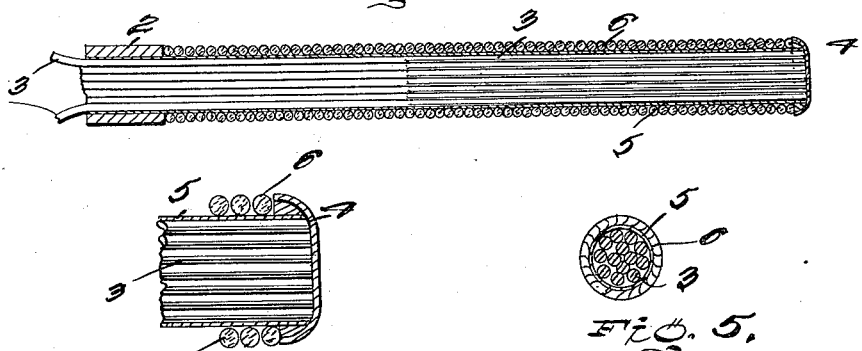
WITNESSES
INVENTOR
George F. Hess.
By ........... Attorney.
COLUMBIA PLANOGRAPH CO., WASHINGTON, D. C.

UNITED STATES PATENT OFFICE.

GEORGE F. HESS, OF LOUISVILLE, KENTUCKY.

COMBINED EGG-BEATER AND CREAM-WHIP.

1,004,786. Specification of Letters Patent. Patented Oct. 3, 1911.

Application filed November 21, 1910. Serial No. 593,517.

*To all whom it may concern:*

Be it known that I, GEORGE F. HESS, citizen of the United States, residing at Louisville, in the county of Jefferson and State of Kentucky, have invented certain new and useful Improvements in Combined Egg-Beaters and Cream-Whips, of which the following is a specification, reference being had therein to the accompanying drawing.

This invention relates to egg beaters. The principal object of the same is to provide a beater which will thoroughly break up the egg and cause the same to be thoroughly mixed with air. This device may be also used for whipping cream.

Another object of the device is to produce an efficient means for securing the ends of the wires together, so as to form them into a handle.

This beater is illustrated in the accompanying drawings wherein:

Figure 1 is a perspective view of the egg beater having the cord binding and tape removed from the handle portion. Fig. 2 is an enlarged view of the finished handle portion of the beater. Fig. 3 is a longitudinal sectional view through Fig. 2. Fig. 4 is an enlarged fragmentary view of the handle portion showing how the same is constructed. Fig. 5 is a transverse sectional view through the finished handle. Fig. 6 is a view of the modified form of the egg beater showing how the strands appear when the adjusting collar is moved.

Referring to the accompanying drawings by numerals, it will be seen that the improved beater is formed from a plurality of strands of spring wire 1 which are bowed intermediate their length to form spaced apart diverging crossed members which are brought together near their ends and secured by a collar 2 to form a substantial conical shaped egg beating portion. The remaining portions of the strands are brought together to form a handle 3 composed of a plurality of wires which are dipped in solder or the like to hold the same together and form a very strong handle. Before the solder hardens a metallic cup 4 is placed against the ends of the wire and secured thereto by means of the solder thus forming an end cup. After the solder has become cool, the handle portion 3 is wrapped with a layer of tire tape 5 and the collar 2 is slipped over the end to hold the same in place, and also by a sticky substance on the tire tape the collar is held in the desired place. The handle portion is now wrapped with a cord binding 6 thus forming a very good hand grip. The end cup 4 prevents any danger of the cord slipping off of the end of the beater and the collar prevents any danger of it becoming loosened at the upper end of the handle. As this binding is put on when the tied tape has not yet dried, the binding is very securely held in place.

In the modified form shown in Fig. 6 the collar 2 is slidably mounted upon the handle portion so that when it is desired to bring the bowed portions of the beater closer together the collar may be slipped to a position as shown in full lines and will thus hold the wires in the desired position. When it is desired to return the beater to its original shape the collar is slipped back to its normal position as shown in the dotted lines and the wires return to their normal position.

By means of the construction shown in these drawings an egg beater is formed which has a very strong solid handle which is very easy and cheap to make as it requires merely the strands of wire, and the solder and other described means for holding them together. It does not need a separate handle or a central cord to support the wires such as many egg beaters now on the market require, and would therefore be very cheap and easy to manufacture.

What I claim is:—

1. An egg beater formed from a plurality of bowed freely expanding wires, said wires being soldered together for a portion of their length, a collar slidably mounted upon the unsoldered portions of said wires, and a covering for said soldered portion.

2. An egg beater formed from a plurality of bowed freely expanding wires, the end portions of said wires being secured together to afford a rigid handle, a collar mounted upon said wires, an end cup secured to said wires, a layer of adhesive tape upon said wires between said cup and collar, and a layer of binding cord upon said tape.

3. An egg beater comprising a plurality of freely expanding wires, a handle for said wires, and means slidably mounted upon said wires whereby the expansion of said wires can be regulated.

In testimony whereof I hereunto affix my signature in presence of two witnesses.

GEO. F. HESS.

Witnesses:
H. B. Pieper,
W. H. Pieper.

Copies of this patent may be obtained for five cents each, by addressing the "Commissioner of Patents, Washington, D. C."